(12) United States Patent
Shimazaki

(10) Patent No.: US 11,604,932 B2
(45) Date of Patent: *Mar. 14, 2023

(54) ANTENNA CONTROL APPARATUS

(71) Applicant: TOSHIBA TEC KABUSHIKI KAISHA, Tokyo (JP)

(72) Inventor: Takeshi Shimazaki, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 198 days.

This patent is subject to a terminal disclaimer.

(21) Appl. No.: 16/816,145

(22) Filed: Mar. 11, 2020

(65) Prior Publication Data

US 2020/0210655 A1  Jul. 2, 2020

Related U.S. Application Data

(63) Continuation of application No. 16/172,612, filed on Oct. 26, 2018, now Pat. No. 10,599,891, which is a
(Continued)

(30) Foreign Application Priority Data

Feb. 29, 2016 (JP) ................... 2016-037614

(51) Int. Cl.
*G06K 7/10* (2006.01)
*G08B 5/36* (2006.01)
*H01Q 1/22* (2006.01)

(52) U.S. Cl.
CPC ..... *G06K 7/10356* (2013.01); *G06K 7/10009* (2013.01); *G08B 5/36* (2013.01); *H01Q 1/2216* (2013.01)

(58) Field of Classification Search
CPC .. G06K 7/10356; G06K 7/10009; G08B 5/36; H01Q 1/2216
See application file for complete search history.

(56) References Cited

U.S. PATENT DOCUMENTS 6,903,656 B1 * 6/2005 Lee ................ G06K 7/10316
340/572.1
7,046,149 B1   5/2006 Badenhop et al.
(Continued)

FOREIGN PATENT DOCUMENTS

CN   101667270 A   3/2010
JP   H05-81485 A   4/1993
(Continued)

OTHER PUBLICATIONS

Notice of Reasons for Refusal dated Sep. 8, 2020 in corresponding Japanese Patent Application No. 2019-202594 with machine English translation, 4 pages.
(Continued)

*Primary Examiner* — Nay Tun
(74) *Attorney, Agent, or Firm* — Kim & Stewart LLP

(57) ABSTRACT

An antenna control apparatus according to an embodiment includes a communication interface configured to receive identification information indicating whether each of a plurality of antennas received transmission information from a wireless tag. A storage unit stores a count for each of the plurality of antennas. A controller determines, for each of the plurality of antennas, whether the antenna received transmission information from a wireless tag based on a first received identification information. When at least one, but not all, of the plurality of antennas is determined to have not received transmission information from a wireless tag based on the first received identification information, the storage unit increments the count for each such antenna. When the count for one of the plurality of antennas is determined to
(Continued)

exceed the predetermined value, the controller outputs a notification signal indicating that the one of the plurality of antennas has a malfunction.

18 Claims, 9 Drawing Sheets

Related U.S. Application Data continuation of application No. 15/441,918, filed on Feb. 24, 2017, now Pat. No. 10,140,484.

(56) References Cited

U.S. PATENT DOCUMENTS

| | | | | |
|---|---|---|---|---|
| 8,610,541 | B2 | 12/2013 | Coty et al. | |
| 2003/0142003 | A1* | 7/2003 | Horst | H01Q 1/3225 342/174 |
| 2005/0230472 | A1 | 10/2005 | Chang | |
| 2007/0194930 | A1* | 8/2007 | Hunt | G06K 7/10356 340/572.7 |
| 2007/0229275 | A1* | 10/2007 | Malik | H04B 5/0062 455/135 |
| 2008/0136591 | A1* | 6/2008 | Calvarese | G06K 7/0004 340/10.1 |
| 2008/0157923 | A1 | 7/2008 | Coty et al. | |
| 2009/0102610 | A1* | 4/2009 | Lance | G06K 7/0008 340/10.2 |
| 2010/0060453 | A1 | 3/2010 | Kushida et al. | |
| 2010/0141450 | A1 | 6/2010 | Nagai | |
| 2010/0171617 | A1* | 7/2010 | Sano | G06K 7/10316 340/572.1 |
| 2011/0063078 | A1* | 3/2011 | Souma | G06K 7/0095 340/10.1 |
| 2011/0193686 | A1 | 8/2011 | Takatama et al. | |
| 2012/0286929 | A1 | 11/2012 | Kline | |
| 2015/0302708 | A1 | 10/2015 | Hattori | |

FOREIGN PATENT DOCUMENTS

| | | |
|---|---|---|
| JP | 2010-079616 A | 4/2010 |
| JP | 2011-065284 A | 3/2011 |

OTHER PUBLICATIONS

Extended European Search Report dated Jul. 26, 2017, filed in counterpart European Patent Application No. 17156894.2 (7 pages).
Notice of Reasons for Refusal dated Jun. 4, 2019 in corresponding Japanese Patent Application No. 2016-037614 with machine English translation, 6 pages.

* cited by examiner

| ANTENNA NUMBER | COMMODITY CODE | | |
|---|---|---|---|
| A1 | t1 | t5 | t9 |
| A2 | t2 | t6 | t10 |
| A3 | t3 | t7 | t11 |
| A4 | t4 | t8 | t12 |

(b) D2

| ANTENNA NUMBER | COMMODITY CODE | | |
|---|---|---|---|
|  |  |  |  |
| A2 | t2 | t6 | t10 |
| A3 | t3 | t7 | t11 |
| A4 | t4 | t8 | t12 |

(c) D3

| ANTENNA NUMBER | COMMODITY CODE | | |
|---|---|---|---|
| A1 | t1 | t5 | t9 |
| A2 | t2 | t6 | t10 |
| A3 | t3 | t7 | t11 |
| A4 | t4 | t8 | t12 |

(d) D4

| ANTENNA NUMBER | COMMODITY CODE | | |
|---|---|---|---|
|  |  |  |  |
|  |  |  |  |
|  |  |  |  |
|  |  |  |  |

(e) D5

| ANTENNA NUMBER | COMMODITY CODE | | |
|---|---|---|---|
| A1 | t1 | t5 | t9 |
| A2 | t2 | t6 | t10 |
|  |  |  |  |
| A4 | t4 | t8 | t12 |

⋮

(f) D35

| ANTENNA NUMBER | COMMODITY CODE | | |
|---|---|---|---|
| A1 | t1 | t5 | t9 |
| A2 | t2 | t6 | t10 |
|  |  |  |  |
| A4 | t4 | t8 | t12 |

ANTENNA CONTROL APPARATUS

CROSS-REFERENCE TO RELATED APPLICATION

This application is a continuation of U.S. patent application Ser. No. 16/172,612, filed Oct. 26, 2018, which application is a continuation of U.S. patent application Ser. No. 15/441,918, filed Feb. 24, 2017, now U.S. Pat. No. 10,140,484, issued Nov. 27, 2018, which application is based upon and claims the benefit of priority from Japanese Patent Application No. 2016-037614, filed Feb. 29, 2016, the entire contents of which are incorporated herein by reference.

FIELD

Embodiments described herein relate generally to an antenna control apparatus.

BACKGROUND

A POS system may utilize an RFID system capable of collectively reading commodity code tags. In the RFID system, commodity codes of the commodities in a shopping basket are collectively read from the RFID tags attached to the commodities through an antenna of an RFID reader/writer.

In a case in which the RFID reader/writer uses a plurality of antennas, even if malfunction occurs in one of the plurality of antennas, the commodity code can still be read from the RFID tag located in a communication range of the remaining antennas. However, if the malfunctioning antenna is not identified, settlement processing is continued in a state in which the commodity code of the commodity located in the communication range of the malfunctioning antenna is not being read. After the settlement, the commodity for which the commodity code is not read may be taken out of the store without being accounted for in the settlement processing.

DESCRIPTION OF THE DRAWINGS

FIG. 8 illustrates an example flow of correspondence information acquired by the POS terminal.

DETAILED DESCRIPTION

An antenna control apparatus according to an embodiment includes a communication interface configured to receive identification information indicating whether each of a plurality of antennas received transmission information from a wireless tag. A storage unit stores a count for each of the plurality of antennas. A controller determines, for each of the plurality of antennas, whether the antenna received transmission information from a wireless tag based on a first received identification information. When at least one, but not all, of the plurality of antennas is determined to have not received transmission information from a wireless tag based on the first received identification information, the storage unit increments the count for each such antenna. When the count for one of the plurality of antennas is determined to exceed the predetermined value, the controller outputs a notification signal indicating that the one of the plurality of antennas has a malfunction.

Hereinafter, an embodiment of an antenna control apparatus is described in detail with reference to the accompanying drawings. In the embodiment, the antenna control apparatus is utilized in a POS (Point of Sales) system.

Embodiment

Figure 1:
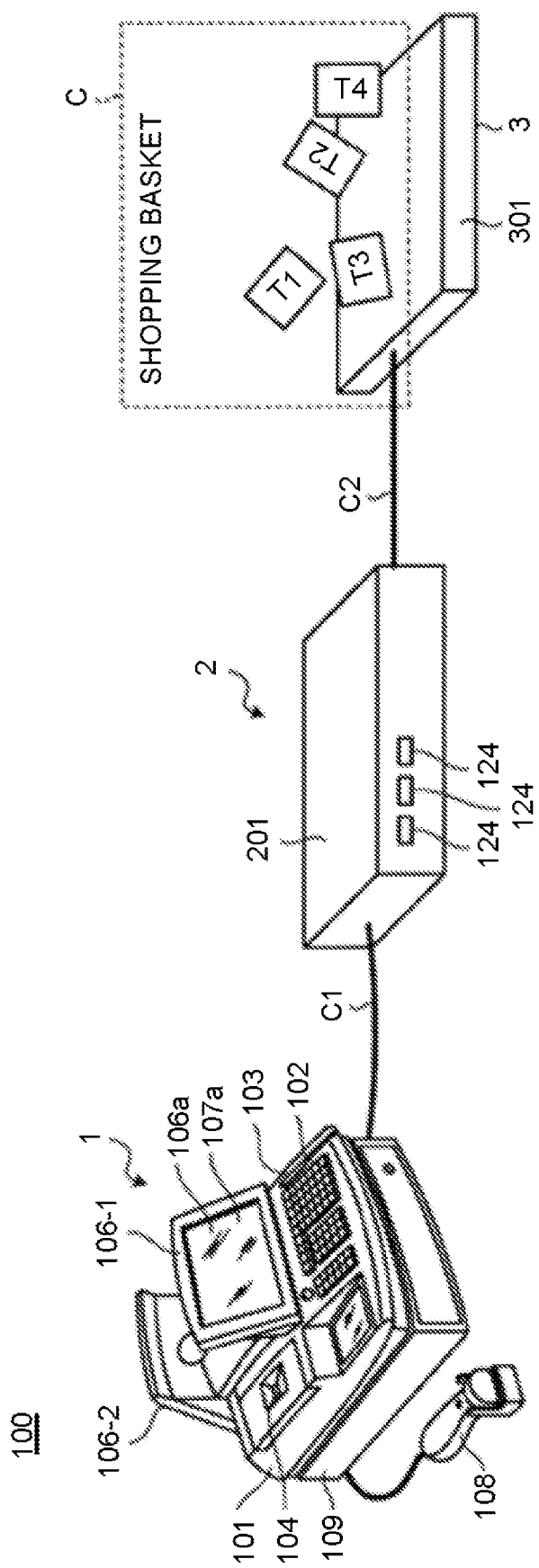
FIG. 1 is an external view illustrating an example configuration of a POS system according to an embodiment.

FIG. 1 is an external view illustrating an example configuration of a POS system 100 according to the present embodiment. A POS terminal 1 shown in FIG. 1 is a POS register which acquires a commodity code of a commodity purchased by a customer to carry out registration and settlement processing with respect to the purchased commodity. The reader/writer 2 controls an antenna unit 3, in response to a reading command output from the POS terminal 1, to acquire the commodity code. The commodity code is received from an RFID (Radio Frequency Identifier) tag via the antenna unit 3. The antenna unit 3 includes a plurality of antennas to receive the commodity code from the RFID tag attached to the commodity in a shopping basket C, indicated by broken lines. In FIG. 1, four RFID tags T1, T2, T3 and T4 are shown as an example, but the number of RFID tags is not limited to the example shown in FIG. 1.

The antenna control apparatus may be included in any one of the POS terminal 1 and the reader/writer 2. As an example, the antenna control apparatus is included in the POS terminal, as shown in FIG. 1.

The POS terminal 1 shown in FIG. 1 includes a keyboard 102, a card reader 103 and a receipt discharge port 104 on the upper surface of a main body 101. The keyboard 102 includes operation keys such as a numeric keypad, a department key, a subtotal key, a deposit/cash total key, a voucher issuing key, a settlement key and the like arranged thereon. The card reader 103 includes a card slot, and reads card information from a credit card, for example, with a reading head in the card slot. The receipt discharge port 104 discharges a receipt printed by a printer 105 (refer to FIG. 2) that is inside the main body 101.

Further, the POS terminal 1 includes a first display 106-1 and a second display 106-2 on the upper surface of the main body 101. The first display 106-1 and second display 106-2 may be liquid crystal displays, for example. The first display 106-1 is arranged so that a display surface 106a is directed toward an operator (hereinafter referred to as a cashier) who operates the keyboard 102. The second display 106-2 is arranged so that the back side thereof faces the back side of the first display 106-1. The display surface 106a of the first display 106-1 may be a touch-input type screen provided with a first touch panel 107a. Similarly, the second display 106-2 may also be a touch-input type screen and can be touched by the customer.

The POS terminal 1 further includes a hand-held scanner 108 for reading a commodity tag, on which a code symbol such as a barcode is printed, attached to the commodity. The POS terminal 1 includes a drawer 109 for storing coins and bills, positioned at the lower side of the main body 101. Further, the POS terminal 1 includes a communication interface such as a USB (Universal Serial Bus) or an RS-232C in the main body 101. The POS terminal 1 and the reader/writer 2 can be connected through the USB or the RS-232C via a connection cable C1.

The reader/writer 2 includes indicator lights 124 in a main body 201. The reader/writer 2 includes a communication interface such as the USB or the RS-232C and a connection port for an antenna cable in the main body 201. The reader/writer 2 and the antenna unit 3 can be connected via an antenna cable C2.

The antenna unit 3 includes four antennas L1, L2, L3 and L4 (refer to FIG. 2) inside a main body 301. The antennas L1, L2, L3 and L4 are arranged to emit radio waves indifferent ranges in the shopping basket C. The antenna unit 3 can receive information from RFID tags T1, T2, T3 and T4 on the commodities in the shopping basket C through the antennas L1, L2, L3 and L4.

Figure 2:
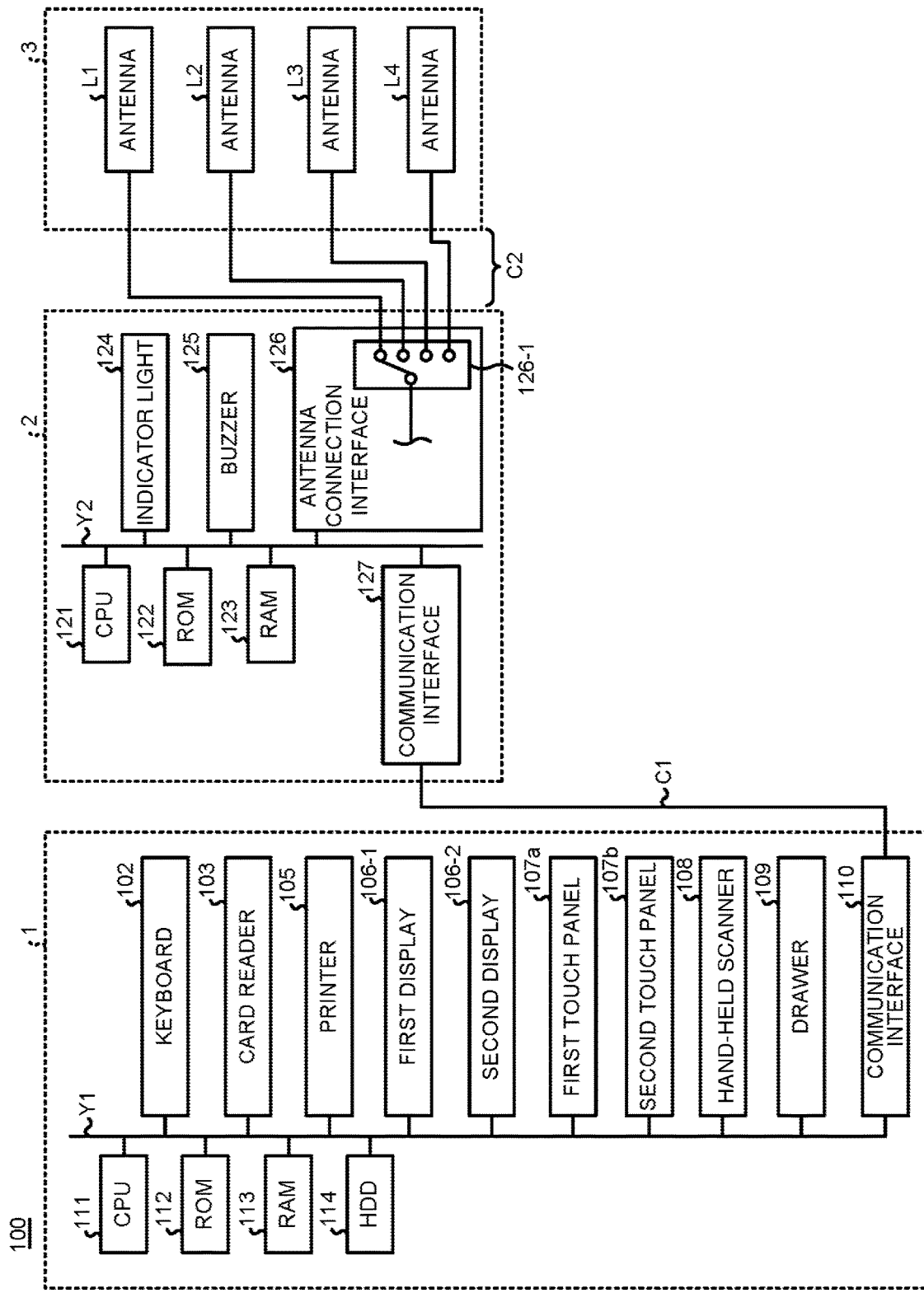
FIG. 2 is a block diagram illustrating an example hardware configuration of the POS system.

FIG. 2 is a block diagram illustrating an example hardware configuration of the POS system 100. The POS terminal 1 includes a CPU (Central Processing Unit) 111, a ROM (Read Only Memory) 112, a RAM (Random Access Memory) 113, an HDD (Hard Disk Drive) 114, the keyboard 102, the card reader 103, the printer 105, the first display 106-1, the second display 106-2, the first touch panel 107a, the second touch panel 107b, the hand-held scanner 108, the drawer 109 and a communication interface 110, which are mutually connected via a bus line Y1.

The CPU 111 executes an arithmetic processing and a control processing for the hardware and each functional section. The ROM 112 stores essential programs such as a BIOS (Basic Input/Output System). The RAM 113 is used as a working area at the time the CPU 111 executes the program. The CPU 111, ROM 112 and RAM 113 may be provided as a microcomputer to control the whole POS terminal 1.

The HDD 114 stores various application programs and various data. The HDD 114 includes, for example, a control program for controlling the POS terminal 1 and a program for commodity registration processing as various application programs. The HDD 114 in the present embodiment stores data such as a flag value and variable values used to detect malfunction of each of the antennas L1, L2, L3 and L4 and screen data such as a notification screen G (refer to FIG. 9) for notifying the malfunction. The HDD 114 further contains a commodity master table, a registration table and the like.

The keyboard 102 outputs an input signal according to an input received through the operation key to the CPU 111. The card reader 103 outputs the card information read by the reading head to the CPU 111. The printer 105 is driven in response to a print command from the CPU 111 to carryout a printing operation for printing print data on a receipt and to discharge the receipt. The first display 106-1 displays screen data output by the CPU 111 on the display surface 106a. The second display 106-2 displays screen data output by the CPU 111 on the display surface of the second display 106-2. The first touch panel 107a detects a touch operation on the display surface 106a and outputs a signal indicating a touch position to the CPU 111. The second touch panel 107b detects a touch operation on the display surface of the second display 106-2 and outputs a signal indicating a touch position to the CPU 111. The hand-held scanner 108 reads a printed surface of the commodity tag attached to the commodity to output the commodity code to the CPU 111. The drawer 109 moves to extend from a housing case of the drawer 109 in response to a releasing signal output by the CPU 111. The communication interface 110 communicates with the communication interface 127 of the reader/writer 2 via the RS-232C or the USB.

Each section of the POS terminal 1 operates with power supplied from a power supply module such as an AC power source or a battery.

The reader/writer 2 shown in FIG. 2 includes a CPU 121, a ROM 122, a RAM 123, indicator lights 124, a buzzer 125, an antenna connection interface 126 and a communication interface 127, which are mutually connected via a bus line Y2.

The CPU 121 executes an arithmetic processing and a control processing of each section. The ROM 122 stores a BIOS and a control program. The RAM 123 is used as a working area for the CPU 121 to execute the program. The RAM 123 has a temporary storage area to store identification information of the antenna and the commodity code as a working area.

The indicator lights 124 may each be an LED that turn on and off according to an output signal from the CPU 121 to each indicator light 124. The buzzer 125 turns a buzzer sound on and off according to an output signal from the CPU 121. The communication interface 127 communicates with the communication interface 110 of the POS terminal 1 via the RS-232C or the USB.

The antenna connection interface 126 alternatively selects ports connected with the antennas L1, L2, L3 and L4 in a predetermined order according to a control signal from the CPU 121 to communicate with the RFID tag through each of the antennas L1, L2, L3 and L4. FIG. 2 shows a switch 126-1 for selecting ports with an electronic or mechanical switching as an example. The antenna connection interface 126 drives an antenna connected with the port to transmit an inquiry wave and receives a response wave via the antenna.

The reader/writer 2 operates with power from a power supply module such as an AC power source or a battery.

The antenna unit 3 includes four antennas L1, L2, L3 and L4. Each of the antennas L1, L2, L3 and L4 is, for example, an antenna of a circularly polarized system, and is a device capable of carrying out both transmission and reception. Each of the antennas L1, L2, L3 and L4 is connected with the antenna connection interface 126 of the reader/writer 2 via the antenna cable C2.

Next, the functional block of the POS terminal 1 is described. The POS terminal 1 reads out various programs from the ROM 112 and the HDD 114 to the RAM 113 to execute the programs and perform various functions such as a commodity registration function, a commodity settlement function and an antenna malfunction detection function.

Figure 3:
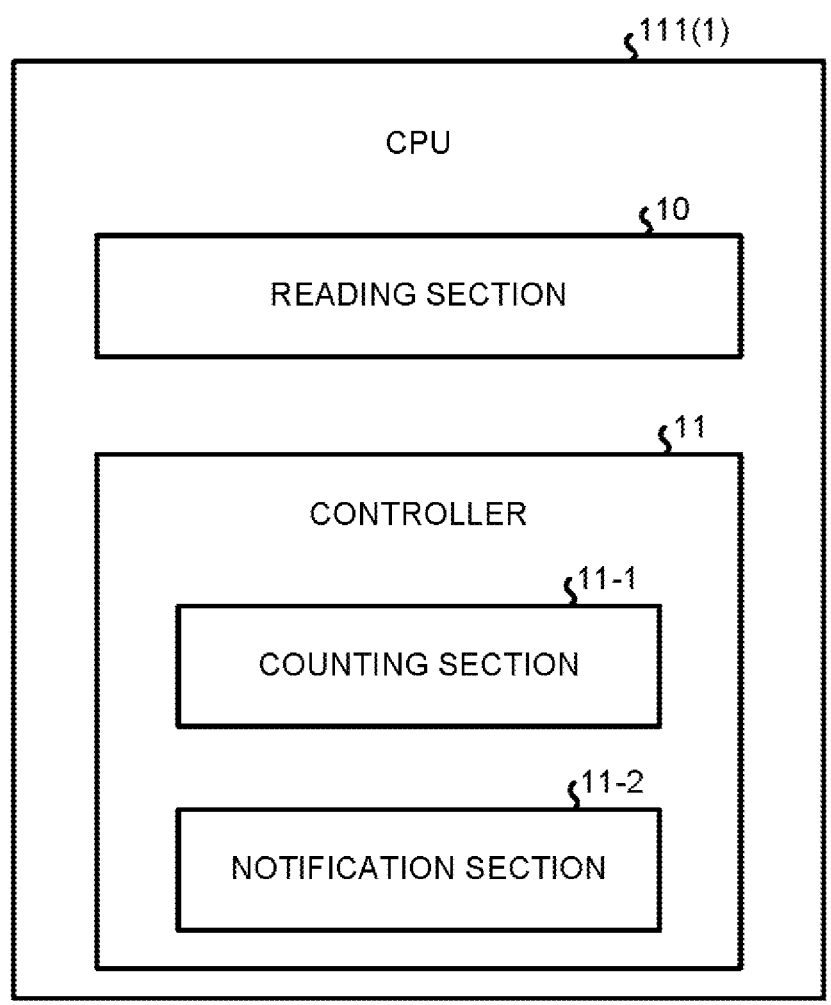
FIG. 3 is a diagram illustrating an example functional block configuration of a POS terminal.

FIG. 3 is a diagram illustrating an example functional block configuration of the POS terminal 1 relating to the malfunction DETECTION OF THE ANTENNAS. A READING SECTION 10 SHOWN IN FIG. 3 outputs the reading command of the RFID tag to the communication interface 110 (refer to FIG. 2). In response to the reading command, the communication interface 110 outputs a signal E1 (refer to FIG. 4) indicating a reading start of the RFID tag to the reader/writer 2 (refer to FIG. 4) connected with the communication interface 110. The reading section 10 acquires correspondence information D (refer to FIG. 4) sent by the reader/writer 2 to the POS terminal 1 via the communication interface 110 (refer to FIG. 2). The correspondence information D (described further later) is generated by associating the commodity code received by each of the antennas L1, L2, L3 and L4 (refer to FIG. 4) with the identification information (antenna numbers A1, A2, A3 and A4) of the antenna which receives the commodity code by the reader/writer 2 (refer to FIG. 4).

The controller 11 (shown in FIG. 3) outputs the notification signal to a notification module of the POS terminal 1 when at least one of the antenna numbers A1, A2, A3 and A4 (refer to FIG. 4) is not included in the correspondence information D (refer to FIG. 4) read by the reading section 10. In the present embodiment, the POS terminal 1 (refer to FIG. 2) includes the first display 106-1 (refer to FIG. 2) and the second display 106-2 (refer to FIG. 2) as the notification module. Thus, the controller 11 outputs a notification screen data as the notification signal to the notification module. In the foregoing description, the notification signal is output when at least of the antenna numbers A1, A2, A3 and A4 is not included in the correspondence information D. However, the output condition of the notification signal may be different according to a format of the correspondence information D generated by the reader/writer 2. For example, as one condition, a case in which at least one antenna number is absent is described above. Alternatively, there may be a case in which each antenna number is included in the correspondence information D but no commodity code corresponding to each antenna number is contained. In the present embodiment, the description is based on the assumption that the notification signal is output there is at least one antenna number not included in the correspondence information D (the former condition).

With respect to reading of the commodity codes, it is also considered that the commodity code is read or not read by the antennas due to inclination of the RFID tags or overlap of the RFID tags in the shopping basket C (refer to FIG. 1). Thus, it is desirable to take measures to avoid a false determination of a malfunction of an antenna if the commodity code cannot be read due to the inclination or overlap of the RFID tag, for example.

In such a case described above, the controller 11 shown in the present embodiment includes a counting section 11-1 and a notification section 11-2 as an example. The counting section 11-1 counts a number of times, for each of the antenna numbers A1, A2, A3 and A4, the data of the correspondence information D is read by the reading section 10 (for each cycle of concurrent reading). The notification section 11-2 outputs the notification signal when the number of times of any one of the antenna numbers exceeds a threshold value. For the threshold value, an optimum value such as one, five, ten, twenty, thirty or the like may be determined according to arrangement of each of the antennas L1, L2, L3 and L4.

Figure 4:
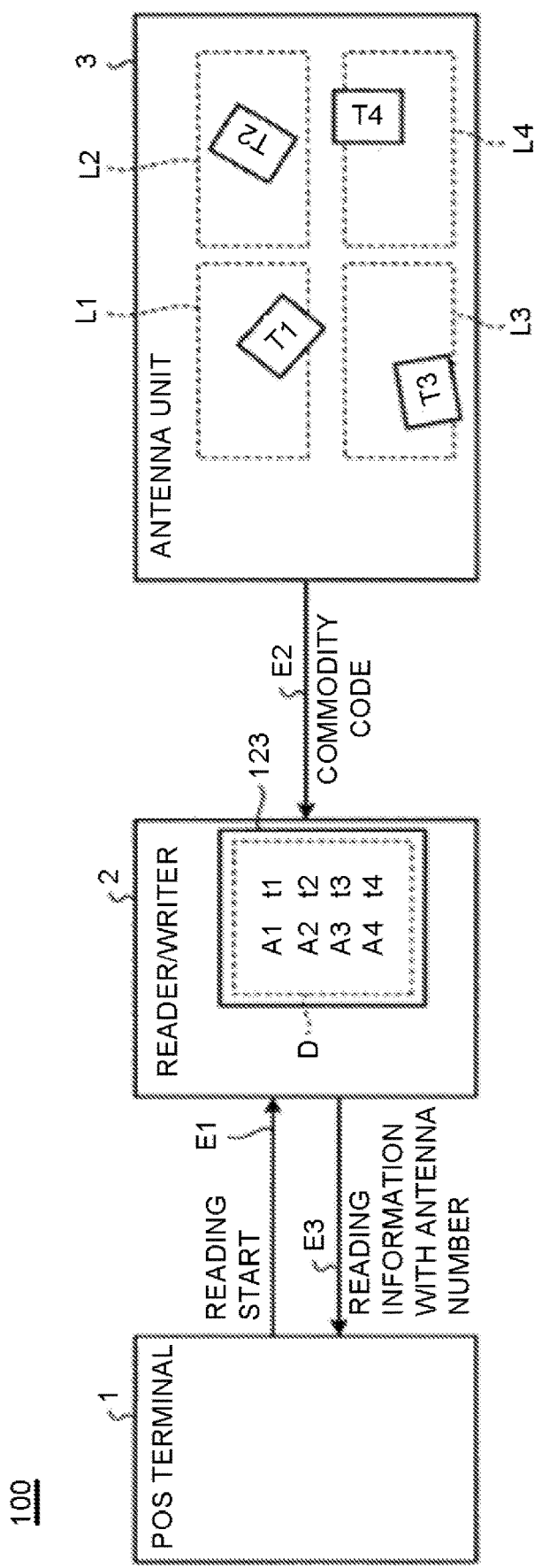
FIG. 4 illustrates a flow of a signal in the POS system when the POS terminal outputs a reading command.

FIG. 4 illustrates a flow of a signal in the POS system 100 when the POS terminal 1 outputs the reading command. As shown in FIG. 4, the signal E1 indicating that POS terminal 1 starts the reading is output to the reader/writer 2.

The reader/writer 2 receives the signal (E1) through the communication interface 127 (refer to FIG. 2); and under the control of the CPU 121 (refer to FIG. 2), the antenna connection interface 126 (refer to FIG. 2) sequentially switches the connecting port of each of the antennas L1, L2, L3 and L4 in a predetermined order. Through the switching, the antennas L1, L2, L3 and L4 (refer to FIG. 4) are driven in the predetermined order to output a signal E2 containing the commodity codes of the RFID tags T1, T2, T3 and T4 to the reader/writer 2.

In the illustrated example, the RFID tags T1, T2, T3 and T4 are arranged as shown in FIG. 4 and the switching of the connection ports of the antennas L1, L2, L3 and L4 is executed in order. In such a case, the reader/writer 2 is first connected with the antenna L1 to acquire from the antenna L1 a commodity code t1 of the RFID tag T1 located in the communication area of the antenna L1. The reader/writer 2 stores the acquired commodity code t1 in the RAM 123 in association with an antenna number A1 of the antenna L1. The reader/writer 2 is connected with the antenna L2 to acquire from the antenna L2 a commodity code t2 of the RFID tag T2 located in the communication area of the antenna L2. The reader/writer 2 stores the acquired commodity code t2 in the RAM 123 in association with an antenna number A2 of the antenna L2. The reader/writer 2 further acquires a commodity code t3 and a commodity code t4 from the antenna L3 and the antenna L4 in order and stores the acquired commodity code t3 and the commodity code t4 in the RAM 123 in association with the antenna numbers of the antennas L3 and L4.

After driving all the antennas L1, L2, L3 and L4 in the predetermined order, the reader/writer 2 transmits the correspondence information D—in other words, each of the commodity codes t1, t2, t3 and t4 acquired via each of the antennas L1, L2, L3 and L4 in correspondence with the antenna number of the antenna used to acquire each the commodity code—as a reading signal E3 with the antenna numbers from the communication interface 127 (refer to FIG. 2) to the POS terminal 1.

The POS terminal 1 receives the reading signal (E3) with the antenna numbers sent from the reader/writer 2 after the output of the reading command (E1) to carry out a processing relating to a malfunction detection of the antenna on the basis of the correspondence information D contained in the reading signal (E3). The POS terminal 1 carries out a commodity registration and a settlement processing for the commodity codes contained in the correspondence information D when each of the antennas L1, L2, L3 and L4 normally operates. Furthermore, the POS terminal 1 discards the commodity code if a malfunction of the antenna is determined (termination of a cycle of the concurrent reading).

Figure 5:
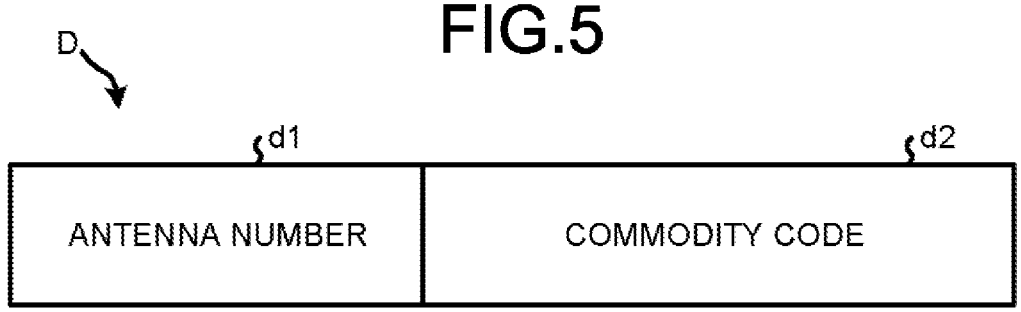
FIG. 5 illustrates an example data structure of correspondence information.

FIG. 5 illustrates an example of the data structure of the correspondence information D. As shown in FIG. 5, the correspondence information D has data structure in which an antenna number d1 and a commodity code d2 are associated with each other. The antenna number d1 indicates the antenna which acquired the commodity code. The commodity code d2 indicates the commodity code acquired by the antenna identified by the antenna number. In a case in which the antenna acquires a plurality of the commodity codes, all the acquired commodity codes are contained.

Figure 6:
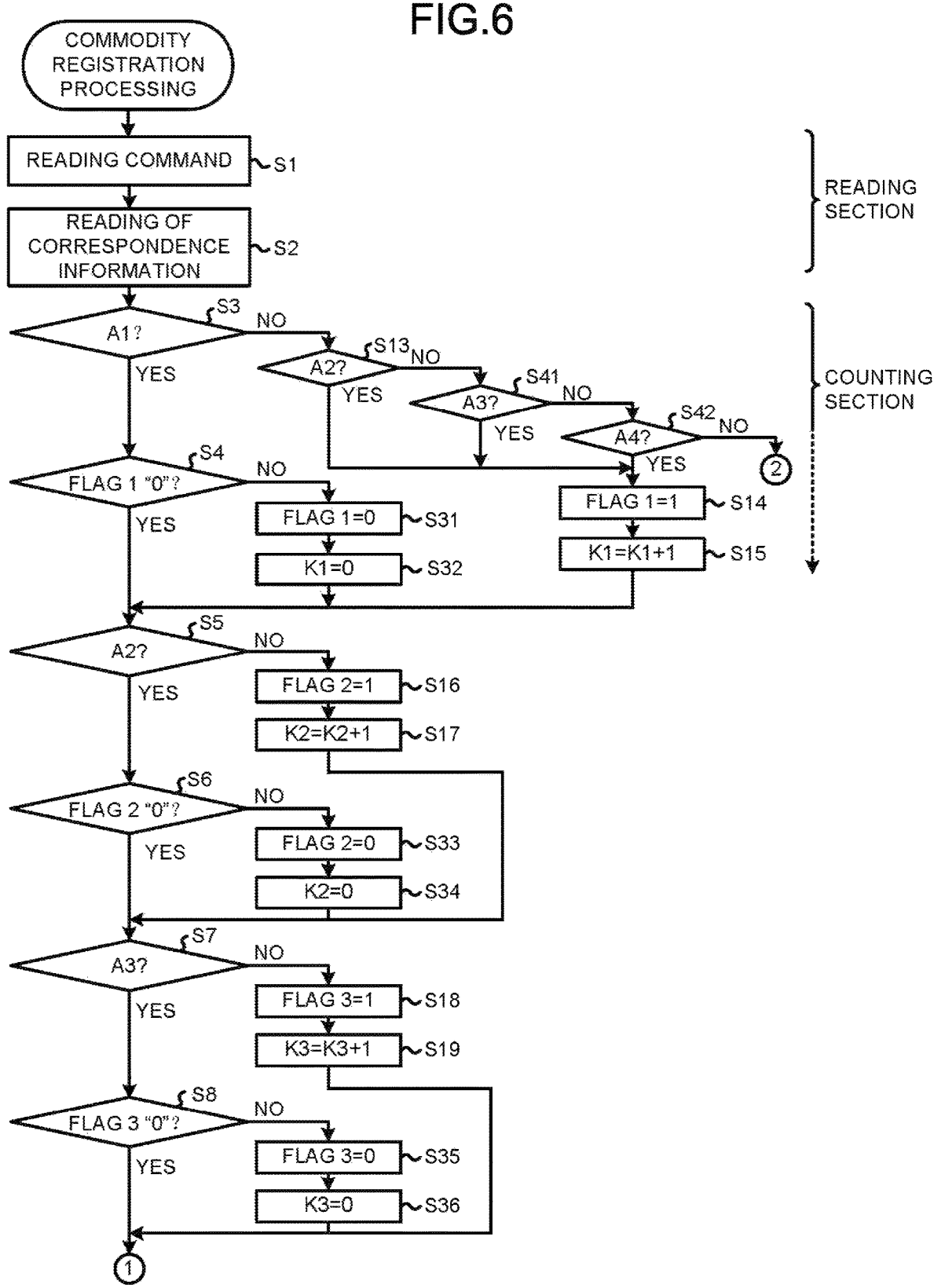
FIGS. 6 and 7 are flow charts illustrating an example sequence of operations for detecting a malfunction of an antenna executed by the POS terminal.
Figure 7:
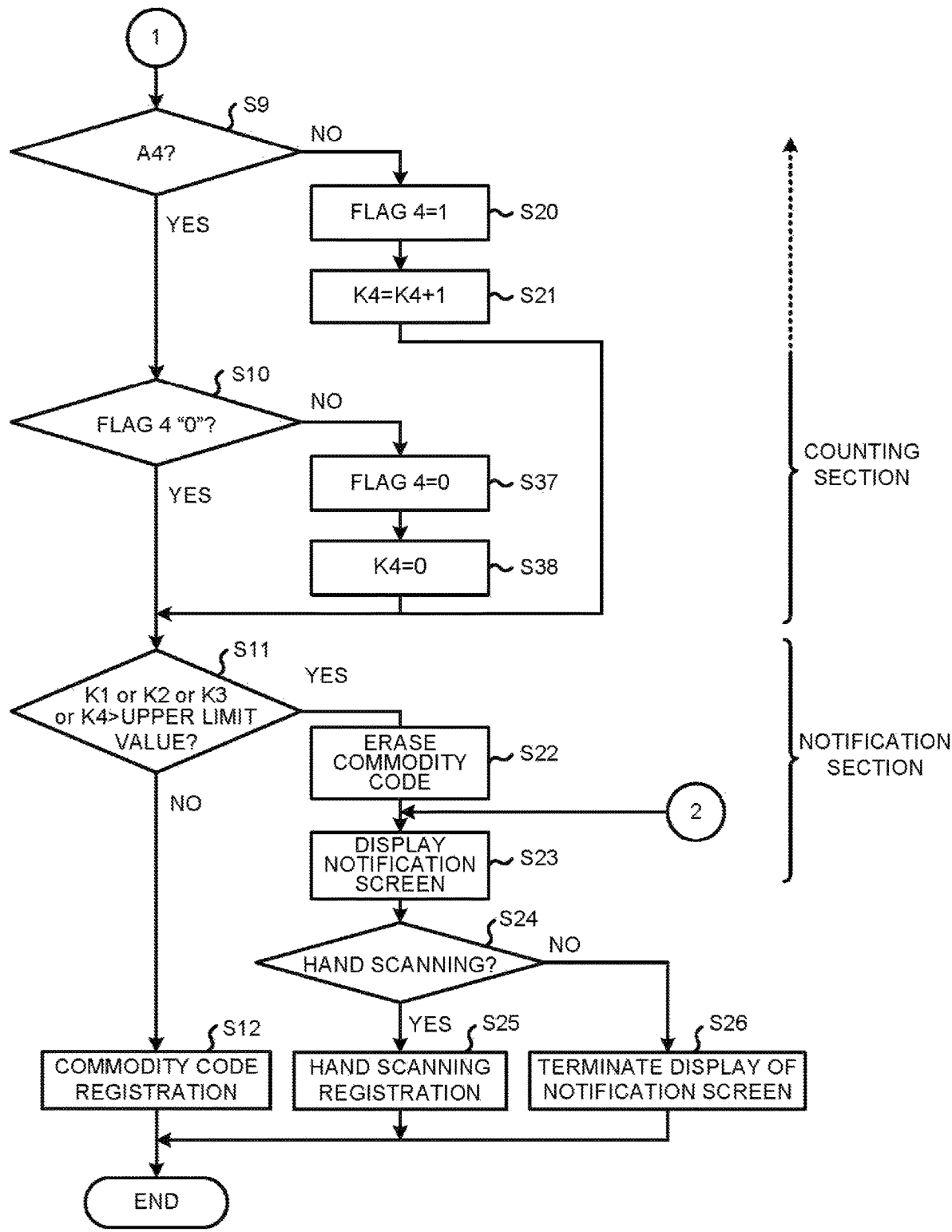

FIG. 6 and FIG. 7 are flow charts illustrating an example sequence of operations for detecting a malfunction of an antenna executed by the POS terminal 1. For example, a customer places the shopping basket C (refer to FIG. 1) at a predetermined position on the antenna unit 3 (refer to FIG. 1), and a cashier, i.e., store clerk touches a concurrent reading key displayed on the first display 106-1 (refer to FIG. 1) of the POS terminal 1. Through such an operation, the CPU 111 receives an input indicating the start of the commodity registration processing from the first touch panel 107a (refer to FIG. 2).

The CPU 111 allocates flag setting areas (flag 1, flag 2, flag 3 and flag 4) and counter areas (parameter K1, parameter K2, parameter K3 and parameter K4) for the antennas in the RAM 113 (refer to FIG. 2).

The flags 1-4 and the parameters K1-K4 are respectively associated with antenna numbers of the antennas acting as an operating object. In particular, the flag 1 and the parameter K1 are associated with the antenna number A1. The flag 2 and the parameter K2 are associated with the antenna number A2. The flag 3 and the parameter K3 are associated with the antenna number A3. The flag 4 and the parameter K4 are associated with the antenna number A4. The antenna acting as the operating object stores the antenna number of the antenna connected with each port in the HDD 114 in advance as setting information to be capable of identifying the antenna. For example, the antenna numbers A1, A2, A3 and A4 are registered in advance from a setting screen of a driver corresponding to the reader/writer 2, and in this way, the antenna acting as the operating object can be identified.

The CPU 111 sets a flag value and variable values of each antenna stored in the HDD 114 to respective values to execute a commodity registration processing program.

The flag setting area indicates whether or not the non-appearance of the antenna number is continuous. In a case in which the value of the flag area is "1", the non-appearance of the antenna number is continuous. The counter area indicates the continuous number of times of the non-appearance of the antenna number. Hereinafter, the processing flow is properly described with reference to FIG. 2.

The CPU 111, first, outputs the reading command for the reader/writer 2 to the communication interface 110 (ACT S1).

The CPU 111 reads the correspondence information D (refer to FIG. 5) received via the communication interface 110 from the reader/writer 2 (ACT S2).

The CPU 111 carries out "a processing of detecting malfunction of the antenna" on the basis of the data read from correspondence information D. In the following examples, the antenna number of each of the antennas L1, L2, L3 and L4 is set to A1, A2, A3 and A4, respectively. In the description exemplified later, there may be commodities with commodity codes t5, t6, following the commodity code t4 in the shopping basket C (refer to FIG. 1).

(Normal Processing in a Case in which all the Antennas L1, L2, L3 and L4 Normally Operate)

Following the processing in ACT S2, the CPU 111 determines whether or not the antenna number A1 is contained in the correspondence information D (ACT S3). If the antenna number A1 is contained in the information D in ACT S3 (Yes in ACT S3), the CPU 111 reads the flag 1 to determine whether or not the value of the flag 1 is "0" (ACT S4). If the value of the flag 1 is "0" in ACT S4 (Yes in ACT S4), the CPU 111 determines whether or not the antenna number A2 is contained in the correspondence information D (ACT S5). If the antenna number A2 is contained in the information D in ACT S5 (Yes in ACT S5), the CPU 111 reads the flag 2 to determine whether or not the value of the flag 2 is "0" (ACT S6).

If the value of the flag 2 is "0" in ACT S6 (Yes in ACT S6), the CPU 111 determines whether or not the antenna number A3 is contained in the correspondence information D (ACT S7). If the antenna number A3 is contained in the information D in ACT S7 (Yes in ACT S7), the CPU 111 reads the flag 3 to determine whether or not the value of the flag 3 is "0" (ACT S8). If the value of the flag 3 is "0" in ACT S8 (Yes in ACT S8), the CPU 111 determines whether or not the antenna number A4 is contained in the correspondence information D (ACT S9). If the antenna number A4 is contained in the information D in ACT S9 (Yes in ACT S9), the CPU 111 reads the flag 4 to determine whether or not the value of the flag 4 is "0" (ACT S10).

If the value of the flag 4 is "0" in ACT S10 (Yes in ACT S10), the CPU 111 determines whether or not anyone of parameters K1, K2, K3 and K4 exceeds an upper limit value (threshold value) (ACT S11). If all the parameters K1, K2, K3 and K4 do not exceed the upper limit value in ACT S11 (No in ACT S11), the CPU 111 executes the registration processing of the commodity codes contained in the correspondence information D (ACT S12). In the registration processing, record information such as a corresponding commodity name and a unit price is acquired from the commodity master table on the basis of the acquired commodity code, and the record information is registered in a registration table as a purchased commodity. Herein, the registration processing is shown; however, the settlement processing may be executed after the registration of the commodity is executed. If the registration processing (or, registration processing and the settlement processing) is terminated, the processing of one transaction is ended, and the CPU 111 displays the concurrent reading key on the first display 106-1.

(Temporary Setting Processing of a Case in which Antenna Malfunction is Suspected)

If the antenna number A1 is not contained in the correspondence information D, No is determined in ACT S3. Then, the CPU 111 determines whether or not the antenna number A2 is contained in the correspondence information D (ACT S13). If the antenna number A2 is contained in the correspondence information D in ACT S13 (Yes in ACT S13), the CPU 111 sets the flag 1 to the value "1" (ACT S14), further adds the value "1" to the value of the parameter K1 to increase the continuous number of times (ACT S15), and proceeds to the processing in ACT S5.

If the antenna number A2 is not contained in the correspondence information D, No is determined in ACT S5. The CPU 111 sets the flag 2 to the value "1" (ACT S16), further adds the value "1" to the value of the parameter K2 (ACT S17), and proceeds to the processing in ACT S6.

If the antenna number A3 is not contained in the correspondence information D, No is determined in ACT S7. The CPU 111 sets the flag 3 to the value "1" (ACT S18), further adds the value "1" to the value of the parameter K3 (ACT S19), and proceeds to the processing in ACT S8.

If the antenna number A4 is not contained in the correspondence information D, No is determined in ACT S9. The CPU 111 sets the flag 4 to the value "1" (ACT S20), further adds the value "1" to the value of the parameter K4 (ACT S21), and proceeds to the processing in ACT S10.

If the non-appearance state "flag value=1" of the antenna number is continuous in the commodity registration processing of each commodity due to the antenna malfunction, the value of the parameter K of the antenna number in the non-appearance state is added by 1 for each transaction, and the value thereof is gradually increased. If the value of the foregoing parameter K exceeds the upper limit value, in ACT S11, the CPU 111 determines that the value of the parameter K exceeds the upper limit value (Yes in ACT S11). As a result, the CPU 111 erases all the acquired commodity codes for one transaction (ACT S22), and outputs a notification screen G (refer to FIG. 9) indicating the antenna number of the antenna which is out of order to the first display 106-1 and the second display 106-2 (ACT S23).

The CPU 111 determines whether or not a hand scanning mode key B1 (refer to FIG. 9) on the notification screen G is touched (ACT S24). If the hand scanning mode key B1 is touched (Yes in ACT S24), the CPU 111 outputs the commodity registration screen instead of the notification screen G to carry out registration of the commodity code using the hand-held scanner 108 (ACT S25). In particular, the CPU 111 receives the commodity code read by the hand-held scanner 108 in ACT S25. The CPU 111 acquires the record information such as the corresponding commodity name and the unit price from the commodity master table on the basis of the received commodity code to register the information in the registration table as the purchased commodity. As described above, the settlement processing may be executed after the registration of the commodity is carried out. If the registration processing (or, the registration processing and the settlement processing) is terminated, the processing of one transaction is ended, and the CPU 111 displays the hand scanning mode key on the first display 106-1.

Furthermore, if a close key B2 (refer to FIG. 9) is touched in ACT S24 (No in ACT S24), the CPU 111 terminates the output of the notification screen G (refer to FIG. 9) to the first display 106-1 and the second display 106-2 (ACT S26).

(Recovering Processing in a Case in which No Antenna Malfunction is Determined after Antenna Malfunction is Suspected)

If the antenna number A1 is contained in a subsequent correspondence information D following a preceding correspondence information in which the antenna number A2 was not contained, No is determined in ACT S4. The CPU 111 sets the value "1" of the flag 1 to the value "0" (ACT S31), further resets the value of the parameter K1 to "0" (ACT S32), and proceeds to the processing in ACT S5.

If the antenna number A2 is contained in a subsequent correspondence information D following a preceding correspondence information in which the antenna number A2 was not contained, No is determined in ACT S6. The CPU 111 sets the value "1" of the flag 2 to the value "0" (ACT S33), further resets the value of the parameter K2 to "0" (ACT S34), and proceeds to the processing in ACT S7.

If the antenna number A3 is contained in a subsequent correspondence information D following a preceding correspondence information in which the antenna number A2 was not contained, No is determined in ACT S8. The CPU 111 sets the value "1" of the flag 3 to the value "0" (ACT S35), further resets the value of the parameter K3 to "0" (ACT S36), and proceeds to the processing in ACT S9.

If the antenna number A4 is contained in a subsequent correspondence information D following a preceding correspondence information in which the antenna number A2 was not contained, No is determined in ACT S10. The CPU 111 sets the value "1" of the flag 4 to the value "0" (ACT S37), further resets the value of the parameter K4 to "0" (ACT S38), and proceeds to the processing in ACT S11.

In the subsequent reading of the commodity code, it is assumed that the commodity code in the shopping basket C (refer to FIG. 1) is read or not read by an antenna due to inclination or overlap of the RFID tag according to the transaction. In order not to determine such a case to be the antenna malfunction by mistake, the continuous number of times is reset in a case of successfully reading the commodity code again so as not to exceed the upper limit value through the processing described above.

(No Counting Processing in which Malfunction of Antenna is not Determined)

If the antenna number A1 is not contained in the correspondence information D, No is determined in ACT S3. Further, if the antenna number A2 is not contained in the correspondence information D, No is determined in ACT S13. The CPU 111 determines whether or not the antenna number A3 is contained in the correspondence information D (ACT S41). If the antenna number A3 is not contained in ACT S41 (No in ACT S41), the CPU 111 determines whether or not the antenna number A4 is contained in the correspondence information D (ACT S42). If the antenna number A4 is not contained in ACT S42 (No in ACT S42), the CPU 111 proceeds to the processing in ACT S23.

If all the antenna numbers A1, A2, A3 and A4 are not contained in the correspondence information D, it is assumed that no RFID tags are attached to the commodities in the shopping basket C. Since the malfunction of the antenna is unlikely to occur, such a case is considered as no counting and the counts of the continuous non-appearance number, i.e., the current values of K1, K2, K3 and K4, are maintained.

Furthermore, if the antenna number A3 is contained in the correspondence information D in ACT S41 (Yes in ACT S41), the CPU 111 proceeds to the processing in ACT S14. This is a processing of a case in which only the antenna numbers A1 and A2 do not appear.

If the antenna number A4 is contained in ACT S42 (Yes in ACT S42), the CPU 111 proceeds to the processing in ACT S14. This is a processing of a case in which all the antenna numbers except the antenna number A4 do not appear.

At the time of the termination of the present program, each value of the flags 1-4 and each value of the parameters K1-K4 are stored in the HDD 114.

FIG. 8 is a diagram illustrating an example of an acquisition flow of the correspondence information D acquired from the reader/writer 2 by the POS terminal 1. FIG. 8(*a*) illustrates correspondence information D1 containing all the antenna numbers A1, A2, A3 and A4. FIG. 8(*b*) illustrates correspondence information D2, acquired in a transaction immediately after the correspondence information D1, which does not contain the antenna number A1. FIG. 8(*c*) illustrates correspondence information D3, acquired in a transaction immediately after the correspondence information D2, which contains the antenna number A1 again. FIG. 8(*d*) illustrates correspondence information D4, acquired in a transaction immediately after the correspondence information D3, which does not contain any antenna number. FIG. 8(*e*) illustrates correspondence information D5, acquired in a transaction immediately after the correspondence information D4, which does not contain the antenna number A3. FIG. 8(*f*) illustrates correspondence information D35 which does not contain the antenna number A3 after a number of transactions equal to the upper limit value subsequent to the correspondence information D5 is carried out. Furthermore, the correspondence information D5-D35 each do not contain the antenna number A3.

Hereinafter, the correspondence relationship between the flow charts of acquisition of the correspondence information shown in FIG. 8 and processing flow charts shown in FIG. 6-FIG. 7 is shown. First, the CPU 111 carries out a normal processing in the transaction of the correspondence information D1.

The CPU 111 subsequently carries out the temporary setting processing of the antenna number A1 in the transaction of the correspondence information D2. In particular, the CPU 111 sets the flag 1 to the value "1" in ACT S14, and further adds the value "1" to the value of the parameter K1 in ACT S15.

The CPU 111 carries out the recovery processing of the antenna number A1 in the transaction of the correspondence information D3 because antenna number A1 is included in correspondence information D3. Accordingly, the CPU 111 resets the flag 1 to value "0" in ACT S31 and further resets the value of the parameter K1 to value "0" in ACT S32.

The CPU 111 carries out the no counting processing in the transaction of the correspondence information D4 because none of the antenna numbers A1-A4 are included in correspondence information D4. Accordingly, the CPU 111 determines No in ACT S3, No in ACT S13, No in ACT S41, No in ACT S42, and maintains the count value of each parameter K1, K2, K3 and K4 of each antenna.

The CPU 111 carries out the temporary setting processing of the antenna number A3 in the transaction of the correspondence information D5 because antenna number A3 is not included in correspondence D5. Accordingly, the CPU 111 sets the flag 3 to the value "1" in ACT S18 and further adds the value "1" to the value of the parameter K3 in ACT S19.

The CPU 111 continues to add the value "1" to the value of the parameter K3 in ACT S19 until the transaction of the correspondence information D35 is carried out.

The CPU 111 determines that the antenna L3 (antenna number A3) is out of order in the transaction of the correspondence information D35 because the value of the parameter K3 exceeds the upper limit value. Accordingly, the CPU 111 displays the notification screen G (refer to FIG. 9) indicating the antenna number A3.

Figure 9:
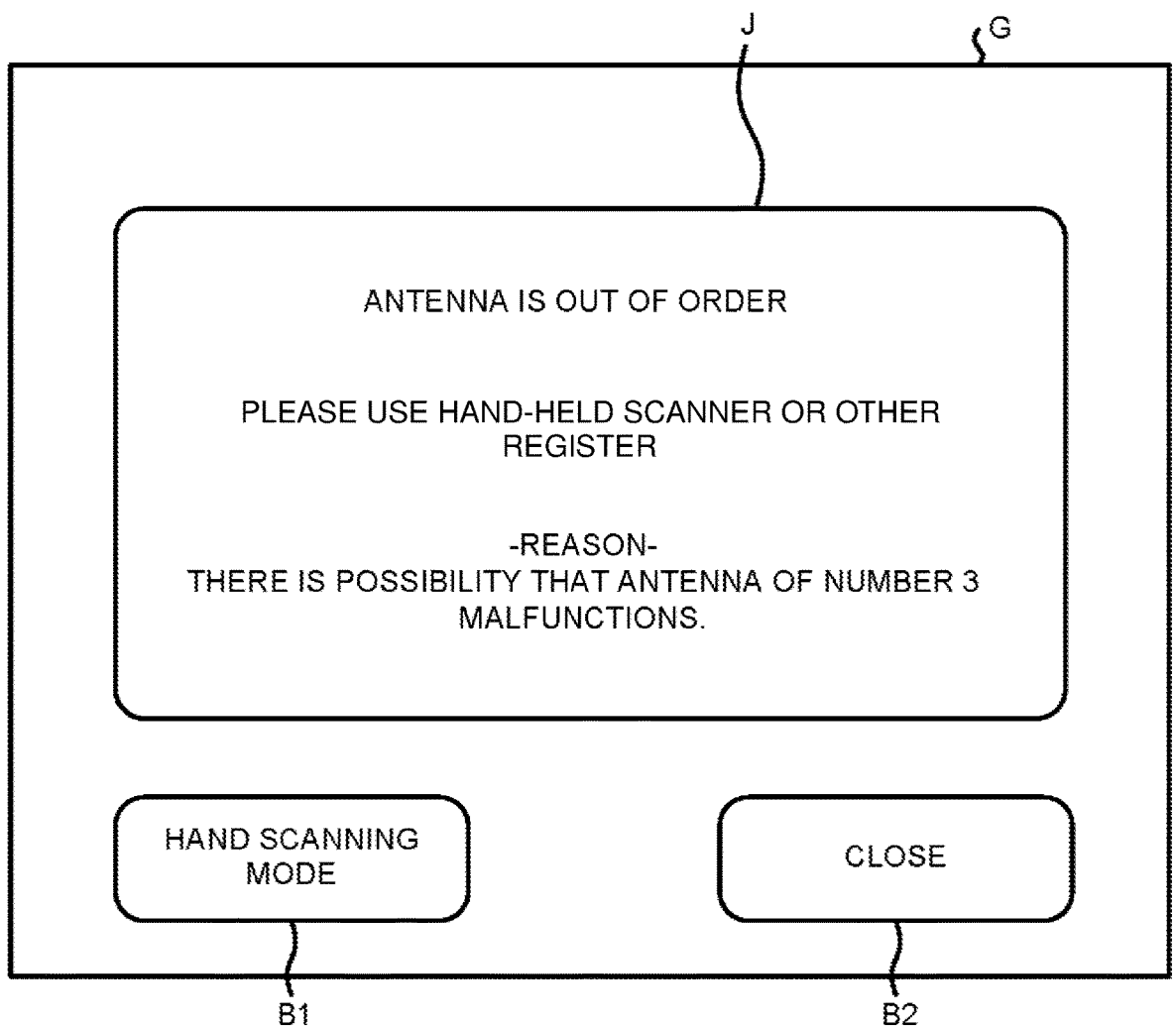
FIG. 9 illustrates an example notification screen displayed on a first display and a second display.

FIG. 9 illustrates an example of the notification screen displayed on the first display 106-1 (refer to FIG. 2) and the second display 106-2 (refer to FIG. 2). The notification screen G shown in FIG. 9 contains notification information J indicating malfunction of the antenna, the hand scanning mode key B1 and the close key B2.

The notification information J contains the antenna number of the antenna which is out of order as the information indicating malfunction of the antenna.

The hand scanning mode key B1 is an operation key for instructing the CPU 111 to proceed with the commodity registration processing in the hand scanning mode (refer to FIG. 2).

The close key B2 is an operation key for instructing the CPU 111 to close the notification screen G being displayed.

In the present embodiment, the RFID tag is shown as an example of a wireless tag for transmitting the commodity code; however, the wireless tag may be one with other communication method as long as it can transmit the commodity code.

In the present embodiment, the antenna unit 3 in which four antennas are built as a plurality of antennas is exemplified. However, the number of the antennas connected to the reader/writer 2 and the arrangement of the antenna are not limited to those. The number of the antennas connected to the reader/writer 2 is not limited as long as the number of the antennas is two or more. Each antenna may be arranged in one antenna unit, or may also be arranged in a plurality of the antenna units. For example, in a case in which there are four antennas, four antenna units each having one antenna may be connected to the four connection ports of the reader/writer 2. If a plurality of the antenna units is arranged, the arrangement of each antenna unit may be properly set. For example, the antenna unit may be properly set, for example, radiation surfaces of the antenna units are respectively placed with an angle each other or the antenna units are arranged at a distance. In addition, the antenna may further include a reflecting member (metal plate, etc.) so that radio waves emitted by the antennas hit the commodity from various directions.

In the present embodiment, the first display 106-1 (refer to FIG. 2) and the second display 106-2 (refer to FIG. 2) are shown as an example of the notification module. However, the notification module is not limited to this. For example, as the notification module, a voice circuit and a speaker may be provided to carry out notification through sound or voice. A rotating light may be provided to carry out notification for a manager, for example.

In the present embodiment, it is described that the reader/writer 2 stores the antenna number and the commodity code in a buffer and transmits the correspondence information D to the POS terminal 1 as a reply of the reading command. However, modification may be made in such a manner that the reader/writer 2 may transmit the commodity code and the corresponding antenna number to the POS terminal 1 every time the commodity code is received to generate the correspondence information D at the POS terminal 1 side.

In the present embodiment, the POS terminal is described as an example of the control apparatus; however, the control apparatus is not limited to the POS terminal. The control apparatus may be applied to other apparatuses. For example, in a case in which the control apparatus is applied to the reader/writer, the reader/writer executes the processing of detecting the malfunction based on the correspondence information acquired from the antenna. The reader/writer lights an indicator light of the reader/writer or sounds a buzzer to notify the cashier of the malfunction if the antenna which is out of order is specified. The reader/writer outputs the notification signal to the POS terminal to enable the POS terminal to display the notification screen.

As described above, the control apparatus according to the present embodiment executes a processing of detecting the malfunction of the antenna based on not only the commodity code (commodity identification information) but also the antenna number (identification information) of the antenna which receives the commodity code. An antenna which is out of order does not acquire a commodity code of the wireless tag, e.g., RFID tag. The control apparatus specifies the antenna which is out of order by detecting such an antenna number, and informs the cashier, i.e., store clerk, of the fault if at least one is specified. Since it may take an operation to cancel the registration of the commodity subject to the execution of the concurrent reading at that time, a case in which a commodity which is not settled is taken out of the store can be avoided.

The programs executed by the control apparatus of the present embodiment may be recorded in a computer-readable recording medium such as a CD-ROM, a FD (Flexible Disk), a CD-R, a DVD (Digital Versatile Disk) and the like in the form of installable or executable file to be provided, or may be executed through being read in the HDD or the ROM (flash ROM) of the control apparatus.

Further, the programs may be stored in a computer connected with a network such as internet and downloaded via the network to be supplied.

Although the configuration of the control apparatus is described in the foregoing embodiment, the embodiment is illustrated as an example but not as limitation to the scope of the present invention. Novel embodiments may be embodied in a variety of other forms; furthermore, various omissions, substitutions, variations or combinations may be devised without departing from the spirit of the inventions. The accompanying claims and their equivalents are intended to cover such forms or modifications as would fall within the scope and spirit of the inventions.

What is claimed is:

1. An information processing apparatus comprising:
   a communication interface configured to communicate with a wireless tag reader having a plurality of antennas each having an identifier (ID);
   a memory; and
   a processor configured to:
     control, via the communication interface, the wireless tag reader to detect a plurality of wireless tags using all the antennas, upon receipt of tag information from any of the wireless tags, store, in the memory, the tag information in association with the ID of one of the plurality of antennas that received the tag information, and upon receipt of tag information from the plurality of wireless tags, issue a notification signal when the ID of one of the plurality of antennas is not associated with any tag information stored in the memory, wherein the information processing apparatus is a point of sales (POS) terminal, and the processor is configured to perform registration processing for an item to be purchased, to which each of the detected wireless tags is attached, based on the tag information stored in the memory.

2. The information processing apparatus according to claim 1, wherein the processor is configured to, upon issuance of the notification signal, determine whether said one of the plurality of antennas has a malfunction, and upon determining that said one of the plurality of antennas has a malfunction, generate a screen displayed on a display and indicating that said one of the plurality of antennas has a malfunction.

3. The information processing apparatus according to claim 1, wherein the processor is configured to, when the ID of one of the plurality of antennas is not associated with any tag information stored in the memory, delete all the tag information stored in the memory.

4. The information processing apparatus according to claim 1, wherein the processor is configured to, when the ID of one of the plurality of antennas is not associated with any tag information stored in the memory, after issuing the notification signal, issue a switch signal to read a symbol of an item to which each of the plurality of wireless tags is attached.

5. The information processing apparatus according to claim 4, wherein the processor is configured to, upon issuance of the switch signal, control a scanner to read the symbol.

6. The information processing apparatus according to claim 4, wherein the processor is configured to upon issuance of the notification signal, determine whether said one of the plurality of antennas has a malfunction, and upon determining that said one of the plurality of antennas has a malfunction, generate a screen displayed on a display and indicating that said one of the plurality of antennas has a malfunction, and in response to a user input through the screen, issue the switch signal.

7. The information processing apparatus according to claim 1, wherein the processor is configured to, upon issuance of the notification signal, determine whether said one of the plurality of antennas has a malfunction, and upon determining that said one of the plurality of antennas has a malfunction, control a speaker to play a sound indicating that said one of the plurality of antennas has a malfunction.

8. The information processing apparatus according to claim 1, wherein each of the antennas is disposed in a different sub-area of an area where a plurality of items are placed.

9. A POS terminal for registering an item to be purchased, comprising:

a communication interface configured to communicate with a wireless tag reader having a plurality of antennas each having an ID; and a processor configured to:

control, via the communication interface, the wireless tag reader to detect a plurality of wireless tags attached to a plurality of items to be purchased, using all the antennas, acquire, from the wireless tag reader via the communication interface, tag information about each of the detected wireless tags and IDs of the antennas used for detecting the wireless tags, when the IDs of all of the antennas are acquired with the tag information, perform registration processing for an item to be purchased, to which each of the detected wireless tags is attached, based on the tag information, and when the ID of any one of the plurality of antennas is not acquired with the tag information, issue a notification signal.

10. The POS terminal according to claim 9, wherein the processor is configured to, upon issuance of the notification signal, generate a screen displayed on a display and indicating that said one of the plurality of antennas has a malfunction.

11. The POS terminal according to claim 9, wherein the processor is configured to store the tag information received from the wireless tag reader in a memory.

12. The POS terminal according to claim 11, wherein the processor is configured to, when the ID of any one of the plurality of antennas is not acquired with the tag information, delete the tag information stored in the memory.

13. The POS terminal according to claim 9, wherein the processor is configured to, when the ID of any one of the plurality of antennas is not acquired with the tag information, after issuing the notification signal, issue a switch signal to read a symbol of an item to which each of the plurality of wireless tags is attached.

14. The POS terminal according to claim 13, wherein the processor is configured to, upon issuance of the switch signal, control a scanner to read the symbol.

15. The POS terminal according to claim 13, wherein the processor is configured to upon issuance of the notification signal, generate a screen displayed on a display and indicating that said one of the plurality of antennas has a malfunction, and in response to a user input through the screen, issue the switch signal.

16. The POS terminal according to claim 9, wherein the processor is configured to, upon issuance of the notification signal, control a speaker to play a sound indicating that said one of the plurality of antennas has a malfunction.

17. The POS terminal according to claim 9, wherein each of the antennas is disposed in a different sub-area of an area where a plurality of items are placed.

18. A method performed by a point of sales (POS) terminal, the method comprising:
- detecting a plurality of wireless tags using all of antennas of a wireless tag reader;
- upon receipt of tag information from any of the wireless tags, storing, in a memory, the tag information in association with an ID of one of the antennas that received the tag information;
- upon receipt of tag information from the plurality of wireless tags, issuing a notification signal when the ID of one of the plurality of antennas is not associated with any tag information stored in the memory; and
- performing registration processing for an item to be purchased, to which each of the detected wireless tags is attached, based on the tag information stored in the memory.

* * * * *